(12) United States Patent
Brennan, III et al.

(10) Patent No.: US 7,302,966 B2
(45) Date of Patent: Dec. 4, 2007

(54) FLOW CONTROL VALVE AND METHOD

(75) Inventors: William E. Brennan, III, Richmond, TX (US); Edward Harrigan, Richmond, TX (US); Christopher S. Del Campo, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 388 days.

(21) Appl. No.: 10/904,400

(22) Filed: Nov. 8, 2004

(65) Prior Publication Data

US 2006/0099093 A1   May 11, 2006

(51) Int. Cl.
*F16K 17/26* (2006.01)
*E03B 15/03* (2006.01)

(52) U.S. Cl. ............... 137/493.9; 137/493; 137/270
(58) Field of Classification Search ............. 137/493.9, 137/493, 270
See application file for complete search history.

(56) References Cited

U.S. PATENT DOCUMENTS

| | | | | |
|---|---|---|---|---|
| 2,934,080 | A | * | 4/1960 | Rice .................... 137/98 |
| 3,456,442 | A | * | 7/1969 | Brooks .................. 60/327 |
| 3,861,414 | A | * | 1/1975 | Peterson, II ............. 137/512.3 |
| 4,439,984 | A | * | 4/1984 | Martin ................... 60/454 |
| 5,473,939 | A | | 12/1995 | Leder et al. |
| 5,509,437 | A | | 4/1996 | Merrett |
| 5,819,853 | A | | 10/1998 | Patel |
| 5,927,402 | A | | 7/1999 | Benson et al. |
| 6,302,216 | B1 | | 10/2001 | Patel |
| 6,808,023 | B2 | | 10/2004 | Smith et al. |

FOREIGN PATENT DOCUMENTS

GB   2 391 239   2/2004

\* cited by examiner

*Primary Examiner*—Anthony Stashick
*Assistant Examiner*—Vikansha Dwivedi
(74) *Attorney, Agent, or Firm*—Matthias Abrell; Kevin P. McEnaney; Dale V. Gaudier

(57) ABSTRACT

A flow control valve includes a body having a fluid passageway therethrough and first and second openings each adapted for receiving or discharging fluid from the passageway. A piston is slidably disposed in the passageway between the first and second openings of the body. The piston has a conduit portion that defines a bore therethrough for conducting fluid through a portion of the passageway. The bore has a reduced flow area. A plug is carried within the body and is equipped with one or more annular seals for sealably engaging the reduced flow area of piston bore so as to close the bore upon translatory movement of the piston, the plug, or a combination thereof. The flow control valve has particular application in downhole tools for communicating fluid into, out of, or through the downhole tool when disposed in a subsurface borehole.

23 Claims, 13 Drawing Sheets

FLOW CONTROL VALVE AND METHOD

BACKGROUND OF THE INVENTION

1. Field of the Invention

The present invention relates to fluid flow control, and more particularly to valves for use in controlling the flow of fluid such as formation fluid and/or borehole fluid within a downhole tool.

2. Background of the Related Art

FIGS. 1 and 2 illustrate a prior art downhole tool A which can be suspended from a rig 5 by a wireline 6 and lowered into a well bore 7 for the purpose of evaluating surrounding formations I. Details relating to apparatus A are described in U.S. Pat. Nos. 4,860,581 and 4,936,139, both assigned to Schlumberger, the entire contents of which are hereby incorporated by reference. The downhole tool A has a hydraulic power module C, a packer module P, and a probe module E. The hydraulic power module C includes pump 16, reservoir 18, and motor 20 to control the operation of the pump 16. Low oil switch 22 also forms part of the control system and is used in regulating the operation of the pump 16.

The hydraulic fluid line 24 is connected to the discharge of the pump 16 and runs through hydraulic power module C and into adjacent modules for use as a hydraulic power source. In the embodiment shown in FIG. 1, the hydraulic fluid line 24 extends through the hydraulic power module C into the probe modules E and/or F depending upon which configuration is used. The hydraulic loop is closed by virtue of the hydraulic fluid return line 26, which in FIG. 1 extends from the probe module E back to the hydraulic power module C where it terminates at the reservoir 18.

The tool A further includes a pump-out module M, seen in FIG. 2, which can be used to dispose of unwanted samples by virtue of pumping fluid through the flow line 54 into the borehole, or may be used to pump fluids from the borehole into the flow line 54 to inflate the straddle packers 28 and 30 (FIG. 1). Furthermore, pump-out module M may be used to draw formation fluid from the borehole via the probe module E or F, and then pump the formation fluid into the sample chamber module S against a buffer fluid therein. In other words, the pump-out module is useful for pumping fluids into, out of, and (axially) through the downhole tool A.

A piston pump 92, energized by hydraulic fluid from a pump 91, can be aligned in various configurations, e.g., to draw from the flow line 54 and dispose of the unwanted sample though flow line 95, or it may be aligned to pump fluid from the borehole (via flow line 95) to flow line 54. The pump-out module M can also be configured where flowline 95 connects to the flowline 54 such that fluid may be drawn from the downstream portion of flowline 54 and pumped upstream or vice versa. The pump-out module M has the necessary control devices to regulate the piston pump 92 and align the fluid line 54 with fluid line 95 to accomplish the pump-out procedure.

With reference now to FIGS. 3A-B and 4A-B, a particular embodiment of the pump-out module M (FIG. 2) may using four reversible mud check valves 390 (also referred to as CMV1-CMV4) to direct the flow of the fluid being pumped is depicted. These reversible valves 390 allow the module M to pump either up or down (assuming a vertical borehole section) or in our out (depending on the tool configuration), and utilize a spring-loaded ceramic ball 391 that seals alternately on one of two O-ring seats 393a, 393b to allow fluid flow in only one direction. The O-ring seats are mounted in a sliding piston-cylinder 394, also called a check valve slide or simply a piston slide.

More particularly, FIGS. 3A-B show the respective first and second strokes of the two-stroke operation of the piston pump 392 with the pump-out module M configured to "pump-in" mode, where fluid is drawn into the module M through a port 346 (e.g., a probe) for communication via a flow line 354. Thus, the solenoids S1, S2 are energized in FIGS. 3A-B so as to direct hydraulic fluid pressure to shift piston slides 394 of check valves CMV1 and CMV2 upwardly and shift piston slides 394 of check valves CMV3 and CMV4 downwardly. This results in the upper springs 395a of check valves CMV1 and CMV2 biasing the respective balls 391 against the lower seal seats 393b, and the lower springs 395b of check valves CMV3 and CMV4 biasing the respective balls 391 against the upper seal seats 393a. This allows fluid to flow upwardly through valve CMV2 and downwardly through valve CMV4 (both shown slightly opened) under movement of the pump piston 392p to the left (the first stroke), as indicated by the directional arrows of FIG. 3A. Similarly, this allows fluid to flow upwardly through valve CMV1 and downwardly through valve CMV3 (both shown slightly opened) under movement of the pump piston 392p to the right (the second stroke), as indicated by the directional arrows of FIG. 3B. Sufficient fluid-flowing pressure (e.g., >50 psig) is needed to overcome the respective spring-biasing forces. Solenoid S3 is provided to selectively move piston 392p from the position in FIG. 3A to the position in FIG. 3B and back. Solenoid S3 is also preferably linked to solenoids S1 and S2 to synchronize the timing therebetween.

FIGS. 4A-B, on the other hand, show the respective first and second strokes of the two-stroke operation of the piston pump 392 with the pump-out module M configured to "pump-out" mode, where fluid is discharged from the flow line 354 through the port 346 into the borehole. Thus, the solenoids S1, S2 have been de-energized in FIGS. 3C-D so as to direct hydraulic pressure to shift piston slides 394 of check valves CMV1 and CMV2 downwardly and shift piston slides 394 of check valves CMV3 and CMV4 upwardly. This results in the lower springs 395b of check valves CMV1 and CMV2 biasing the respective balls 391 against the upper seal seats 393a, and the upper springs 395a of check valves CMV3 and CMV4 biasing the respective balls 391 against the lower seal seats 393b. This allows fluid to flow downwardly through valve CMV1 and upwardly through valve CMV3 (both shown slightly opened) under movement of the pump piston 392p to the left (the first stroke), as indicated by the directional arrows of FIG. 4A. Similarly, this allows fluid to flow downwardly through valve CMV2 and upwardly through valve CMV4 (both shown slightly opened) under movement of the pump piston 392p to the right (the second stroke), as indicated by the directional arrows of FIG. 4B. Again, sufficient fluid-flowing pressure (e.g., >50 psig) is needed to overcome the respective spring-biasing forces.

In each of the FIGS. 3A-B and 4A-B, the check valves having no directional flow arrows are configured such that their respective balls 391 are subjected to fluid pressure assisting the spring-biasing forces, i.e., further compressing each ball against an o-ring seat to maintain a seal. Conversely, when the direction of fluid flow opposes the spring-biasing forces (and overcomes them), a gap is opened between the ball and the seat so as to permit the fluid flow indicated by the directional arrows. The valves open just enough to balance the pressure differential across the opening with the biasing forces provided by the respective springs.

Thus, the fluid being pumped through the tool A flows directly past the O-ring seats 393a, b at various intervals during the two-stoke pumping cycles. Since this fluid (e.g., formation fluid and/or borehole fluid) is often laden with impurities varying from fine mud particles to abrasive debris of various sorts, such flow can and often does produce accelerated wear of the O-ring seats. This wear can shorten the life of the O-rings, and lead to frequent failure of the seals. The following are examples of failures that may occur: 1) the o-ring is gradually worn during the pumping process until it will no longer seal; 2) debris (anything from LCM to heavy oil) gets trapped between the ball and one or both of the O-ring seats; 3) fine particles settle out in the valve cavity, and gradually build up to the point where they will prevent the ball from being able to seal against the seat; and 4) filters that are typically used with such valves are susceptible to plugging. The failure of any one of the four reversible mud check valve seals typically reduces the output of pump 392 down to about half, and the loss of two seals may completely disable the pump.

A need therefore exists for a more reliable check valve, particularly in the region of the O-ring seals. It is desirable that such a check valve have devices to protect the valve seals from erosion when the valve is open and fluid is flowing past the seals. It is further desirable that such a check valve have devices to prevent the valves from leaking over time.

Additionally, a need exists for a flow control valve that provides a larger flow area and/or reduces the risk of solids collecting and plugging the valves.

Additionally, a need exists for a control valve that minimizes the pressure drop across the valve, thereby allowing higher speed pumping and less risk of phase change of the sample being pumped.

SUMMARY OF THE INVENTION

The needs identified above, as well as other shortcomings in the art, are addressed by various aspects of the present invention. In one aspect, the present invention provides a flow control valve, including a body having a fluid passageway therethrough and first and second openings each adapted for receiving or discharging fluid from the passageway. A piston is slidably disposed in the passageway between the first and second openings of the body. The piston has a conduit portion that defines a bore therethrough for conducting fluid through a portion of the passageway. The bore has a reduced flow area. A plug is carried within the body and is equipped with one or more annular seals for sealably engaging the reduced flow area of piston bore so as to close the bore upon translatory movement of the piston, the plug, or a combination thereof.

In particular embodiments of the inventive flow valve, the plug is substantially cylindrical and is equipped with one or more annular recesses for carrying each respective annular seal. Each annular seal may have a sealing face oriented substantially perpendicularly to the axis of the passageway. The annular seals may be elastomeric O-rings.

In particular embodiments of the inventive flow valve, the body has a central annular opening defined by opposing side walls intermediate the first and second openings. The piston of these embodiments is equipped with an outer annular flanged portion intermediate its ends. The flanged portion is disposed within the central annular opening of the body so as to divide the central annular opening into first and second chambers, whereby differential pressure across the chambers induces reciprocal translatory movement of the piston within the passageway of the body.

The conduit portion of the piston may be equipped with an inner flange that defines the reduced flow area, and a tubular stop member on each side of inner flange for limiting translatory movement of the plug within the piston bore. Accordingly, the flow control valve may further include a pair of coil springs each having a first end slidably disposed at least partially within one of the tubular stop members and a second end secured to the body. Each first coil spring end yieldably limits translatory movement of the plug within the piston bore. Thus, increasing the pressure of one of the chambers above that of the other chamber induces translatory movement of the piston within the passageway of the body to a stop position where the outer flanged portion of the piston abuts one of the side walls of the central annular opening. The tubular stop members are thereby moved with the piston such that one of the tubular stop members engages one end of the plug and moves the plug to a position where one of its annular seals engages the inner flange of the piston so as to close the piston bore. The plug is thereby constrained to movement towards the coil spring opposite the engaged tubular stop member when energized by the pressure of fluid flowing between the first and second openings against the engaged end of the plug.

In particular embodiments of the inventive flow valve, the plug is secured to the body so as to remain stationary within the passageway. In these embodiments, the inventive flow valve further includes a first coil spring having a first end secured to the body and a second end disposed in the first chamber and urging the outer flanged portion of the piston to a stop position abutting the side wall of the central annular opening opposite the first chamber. The stop position places the reduced flow area defined by the piston bore into engagement with an annular seal of the plug so as to close the bore. The piston is thereby constrained to movement towards the first coil spring when energized by pressure within the second chamber that overcomes the bias of the first coil spring. Such movement opens the piston bore. The plug may be equipped with a spring-loaded sleeve that overlays each annular seal of the plug when the piston bore is open.

In another aspect, the present invention provides an assembly for pumping fluid at least partially through a downhole tool disposed in a borehole penetrating a subsurface formation. Such pumping may include drawing fluid into the tool, discharging fluid from the tool, and/or moving fluid from one location to another location within the tool. The pumping assembly includes a pump for displacing fluid, a first flow line equipped with one or more control valves for selectively communicating fluid to or from the pump, and a second flow line equipped with one or more control valves for selectively communicating fluid to or from the pump. Each of the control valves include a body having a fluid passageway therethrough and first and second openings each adapted for receiving or discharging fluid from the passageway. A piston is slidably disposed in the passageway between the first and second openings of the body. The piston has a conduit portion that defines a bore therethrough for conducting fluid through a portion of the passageway. The bore has a reduced flow area. A plug is carried within the body and is equipped with one or more annular seals for sealably engaging the reduced flow area of piston bore so as to close the bore upon translatory movement of the piston, the plug, or a combination thereof.

In particular embodiments, the inventive assembly further includes a control system for synchronizing the operation of the pump and the control valves. Thus, in embodiments that employ a two-stroke piston pump for displacing the fluid, the control system may command each control valve to open or close its bore at or near the time that the pump completes each of its two strokes.

In another aspect, the present invention provides a method for controlling fluid flow through a passageway. The inventive method includes the step of slidably disposing a piston in the passageway, the piston having a conduit that reduces the flow area through the passageway. The conduit of the piston is selectively closed using a plug having one or more annular seals. The selective closing step is achieved by movement of the piston, the plug, or a combination thereof.

In particular embodiments of the inventive method, the piston conduit is closed by movement of the piston to a stop position where the plug sealingly engages a portion of the piston conduit. In such embodiments, the plug may be biased to a first position when the piston conduit is moved to the stop position. Accordingly, the plug may be moveable to a second position that opens the piston conduit under fluid pressure in the passageway that overcomes the bias.

Alternatively, the piston may be biased to the stop position and the plug may be constrained against movement. In this case, the piston may be moveable from the stop position under a force that overcomes the bias, whereby the piston conduit is opened.

The inventive method may be employed to advantage in numerous fluid flow applications. Accordingly, particular embodiments further include the step of pumping fluid though the passageway when the piston conduit is opened. In certain of such embodiments, the pumping step is synchronized with the selectively closing step, such that fluid is not pumped through the passageway when the piston conduit is closed. Thus, when the pumping step includes using a two-stroke piston pump, the synchronizing step may include closing the piston conduit at or near the time that the pump completes one stroke of its two-stroke cycle, and opening the piston conduit at or near the time that the pump completes the other stroke of its two-stroke cycle.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
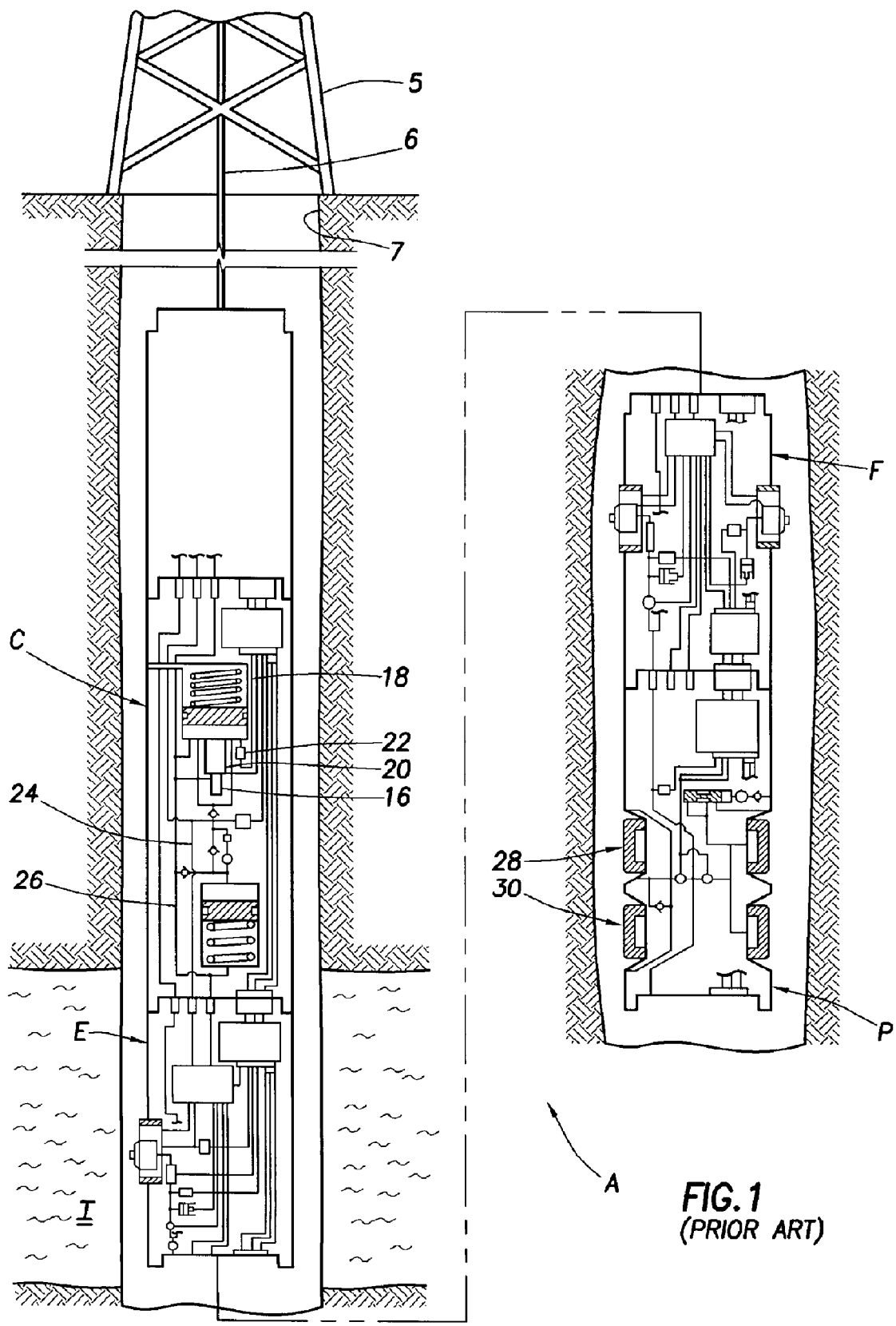
FIGS. 1-2 are schematic illustrations of a wireline-conveyed downhole tool with which the present invention may be used to advantage.
Figure 2:
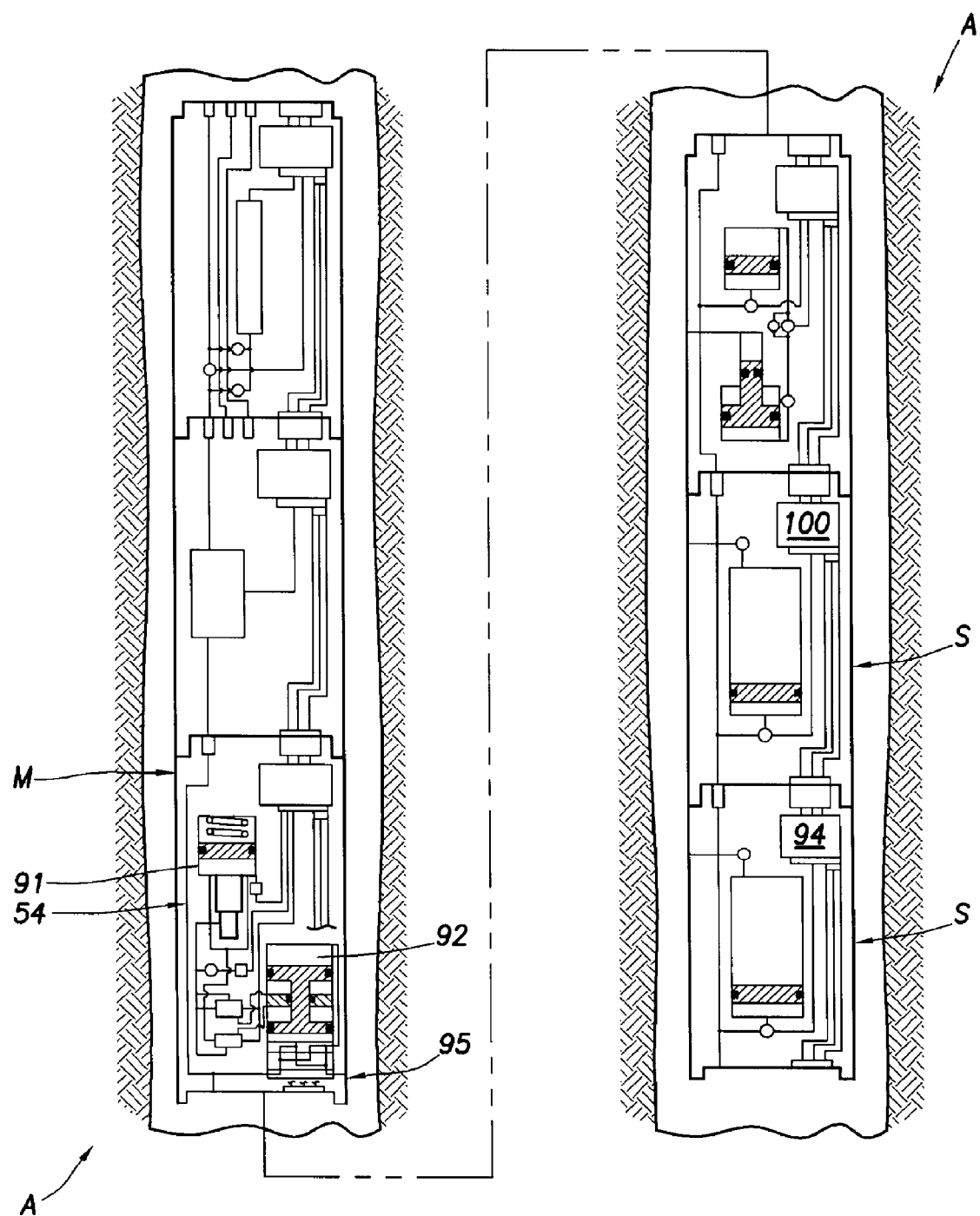
Figure 3A:
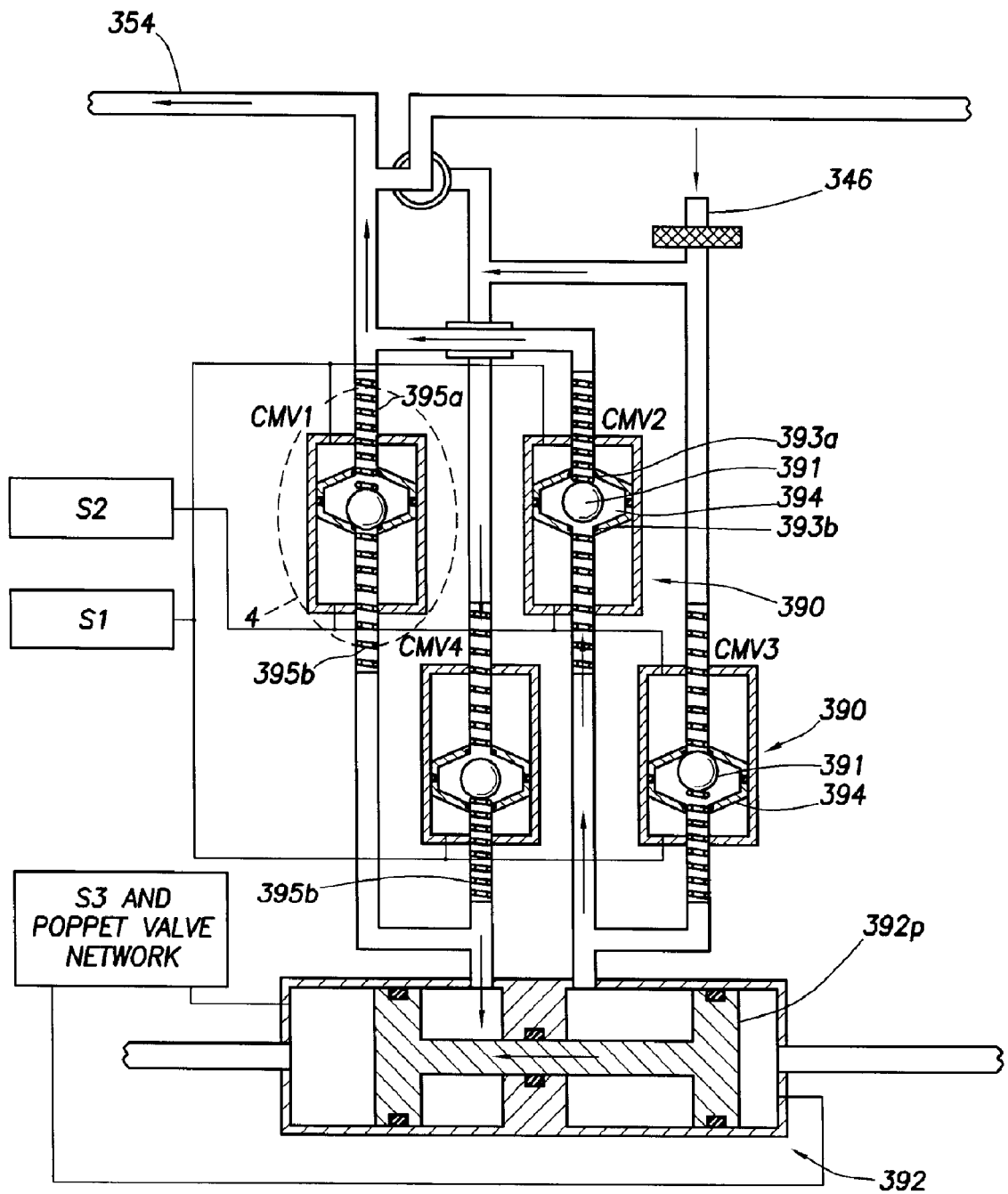
FIGS. 3A-B are schematic illustrations of a prior art fluid pumping module, showing in particular check valve settings and flow directions according to first and second respective strokes of a two-stroke piston "pump-in" cycle.
Figure 3B:
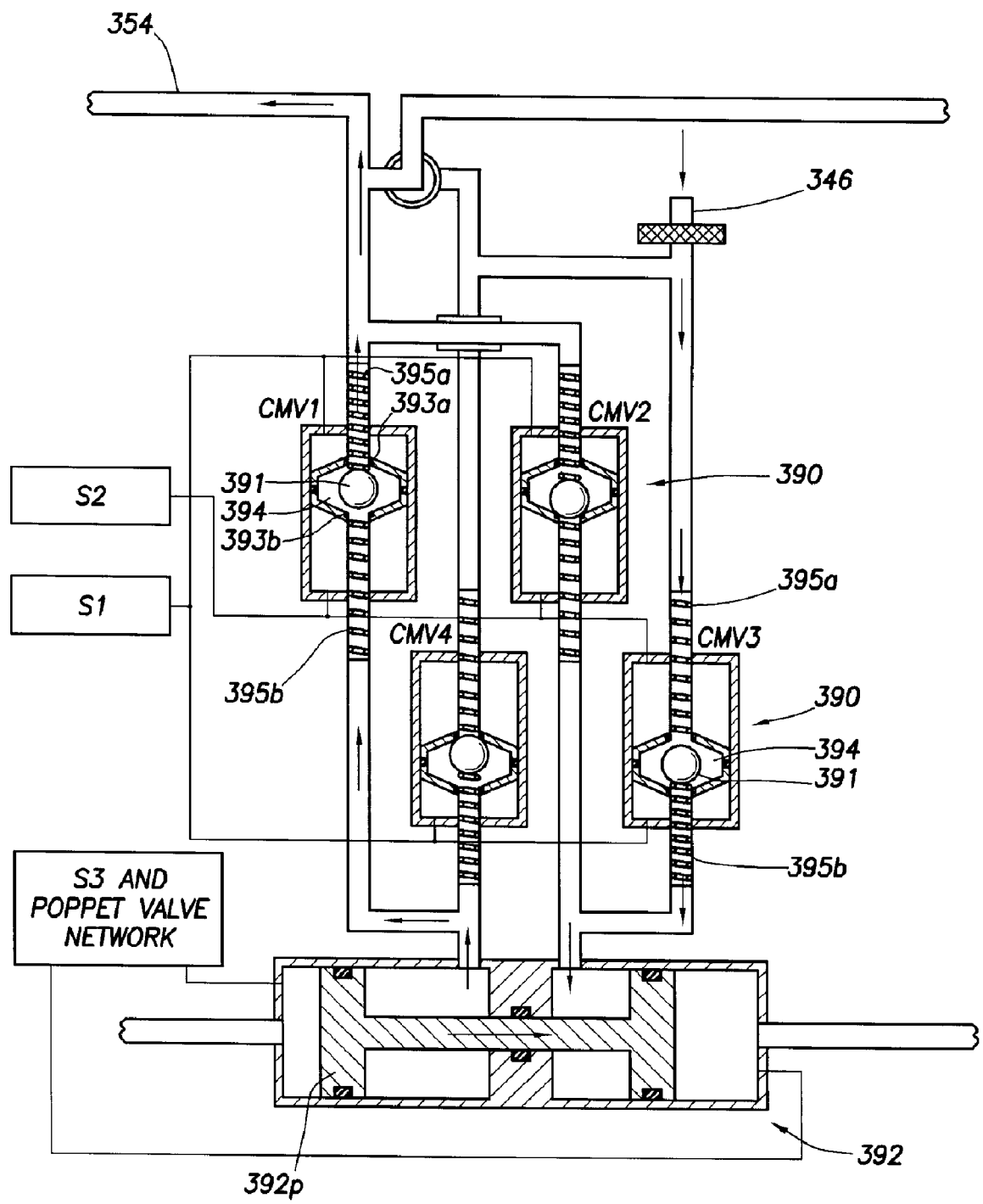
Figure 4A:
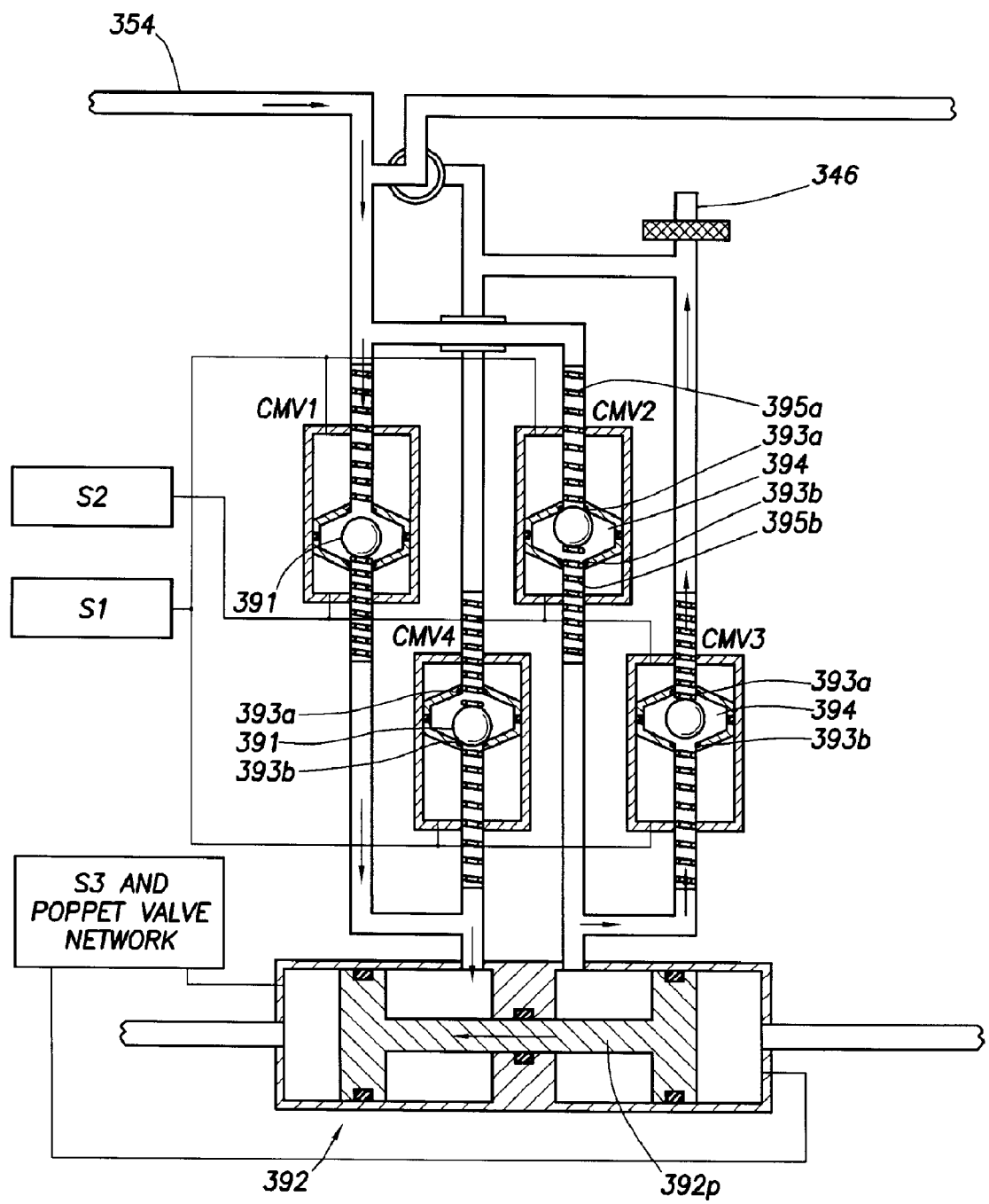
FIGS. 4A-B are schematic illustrations of the prior art fluid pumping module of FIGS. 3A-B, showing in particular check valve settings and flow directions according to first and second respective strokes of a two-stroke piston "pump-out" cycle.
Figure 4B:
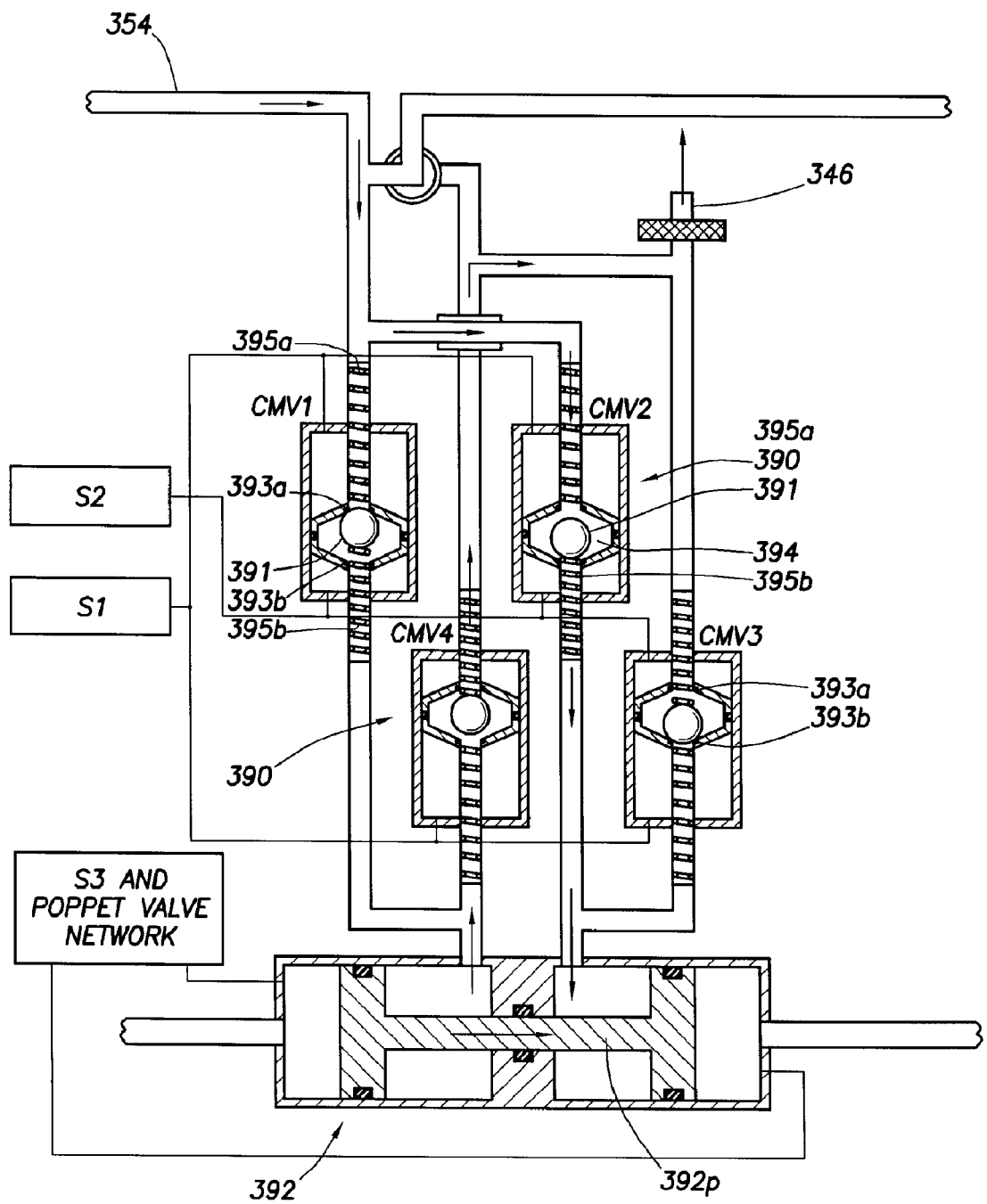
Figure 5A:
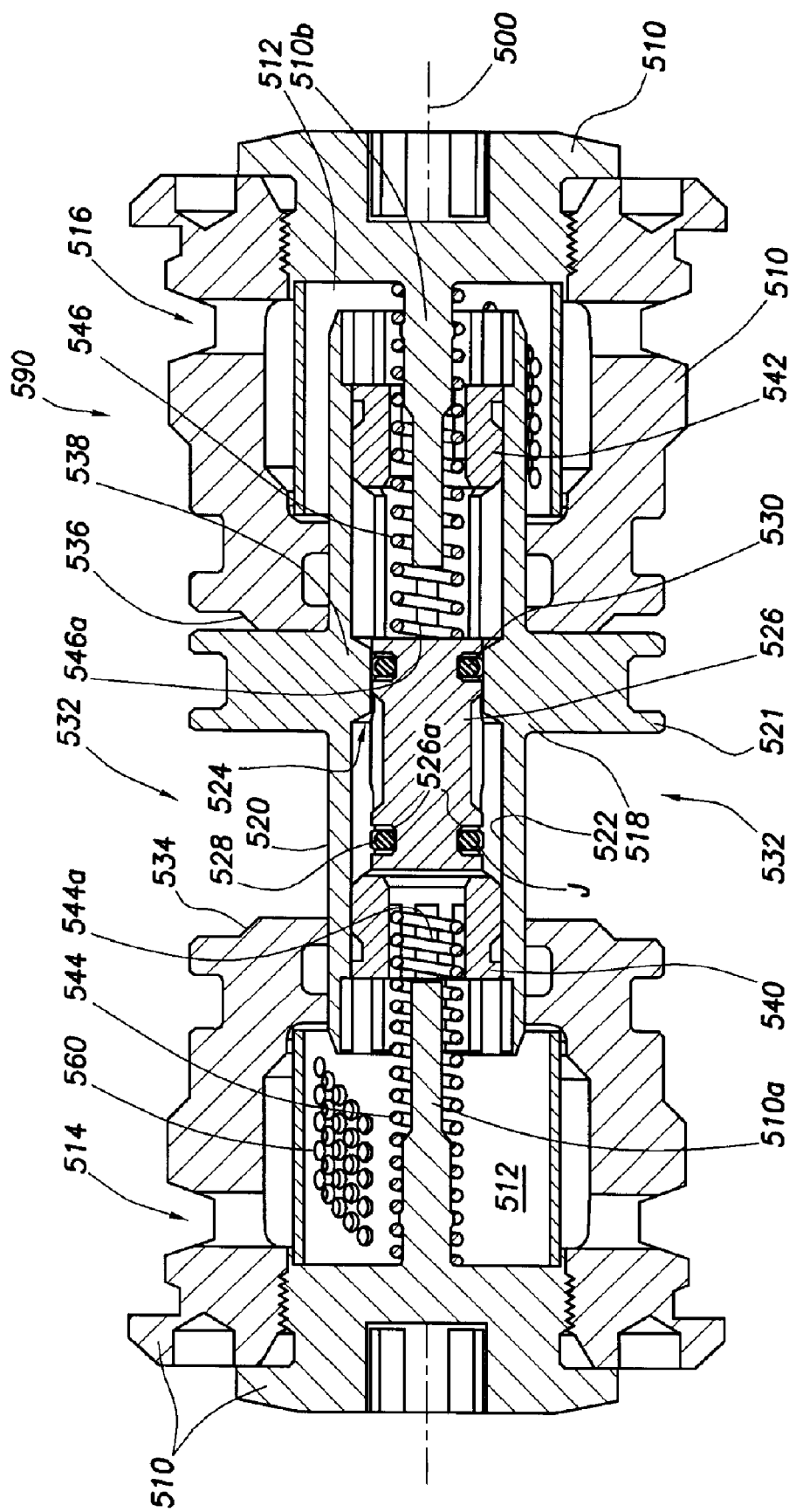
FIGS. 5A-B illustrate an inventive flow control valve in respective closed and open positions, the valve employing a slidable piston and slidable plug according to one embodiment of the present invention.
Figure 5B:
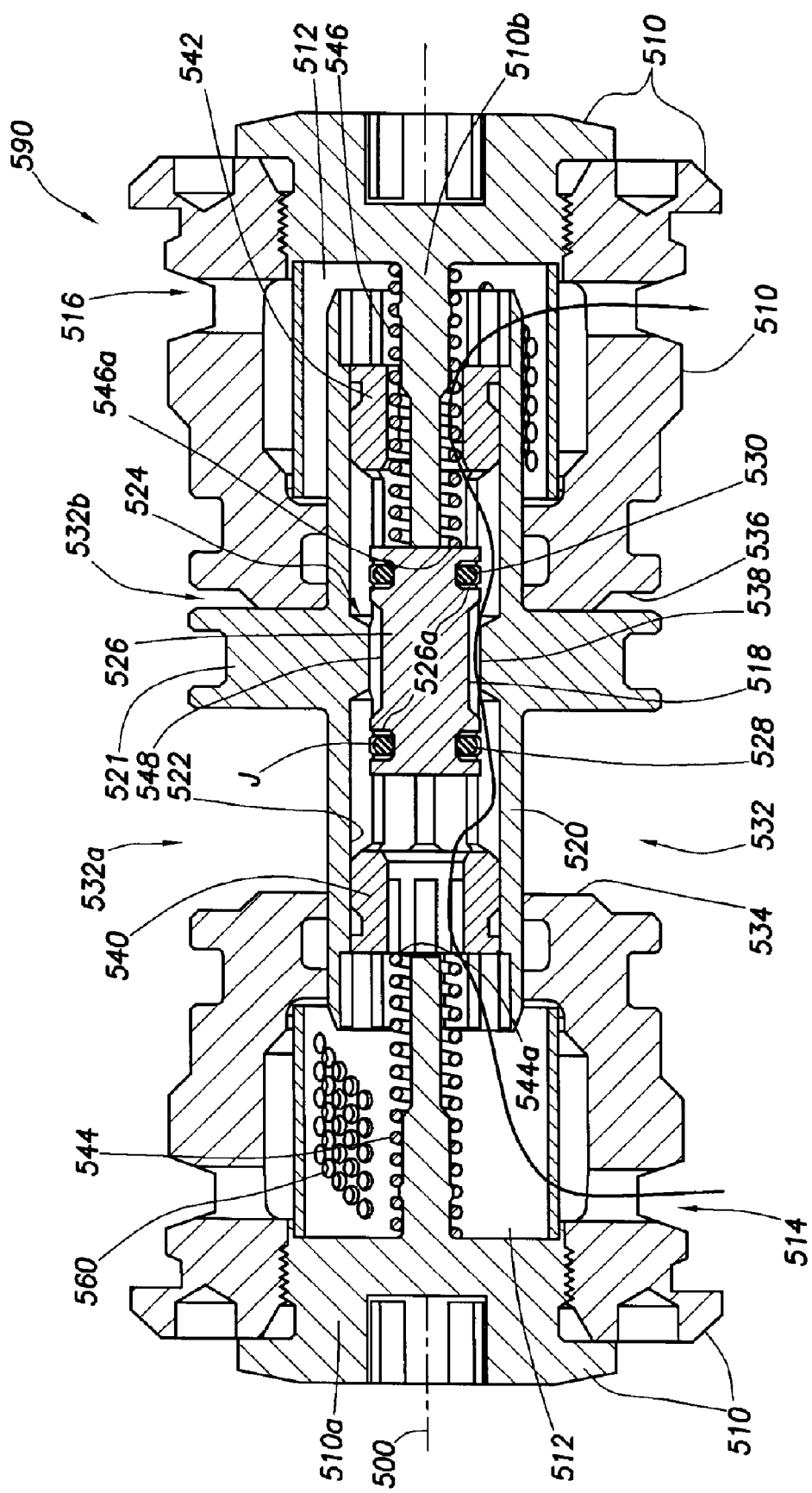

FIGS. 5A-B illustrate an inventive flow control valve 590 in respective closed and open positions. The valve 590 may be used to advantage as a check valve, e.g., as a replacement for check valve CMV1 (also referenced as 390) of FIGS. 3-4 within a downhole tool (see, e.g., tool A of FIGS. 1-2) adapted for use in a borehole environment. Accordingly, the check valve 590 includes a body 510 having a fluid passageway 512 therethrough and first and second openings 514, 516 each adapted for receiving or discharging fluid from the passageway 512.

A piston 518 is slidably disposed in the passageway 512 between the first and second openings 514, 516 of the body 510. The piston 518 has a conduit portion 520 that defines a bore 522 therethrough for conducting fluid through a portion of the passageway 512. The bore 522 has a reduced flow area 524 (described further below). Components such as piston 518 are also referred to in the relevant art as a sliding cylinder, a check valve slide, or simply a piston slide.

A plug 526 is carried within the body 512, and more particularly within the piston bore 522 of the piston 518. The plug 526 is substantially cylindrical and is equipped with a pair of annular recesses (not numbered) for carrying a respective pair of annular seals 528, 530. Each annular seal has a sealing face J oriented substantially perpendicularly to the axis 500 of the passageway 512. The annular seals may be elastomeric O-rings, or various other materials, as dictated by the operating temperatures and pressures in the downhole environment. The annular seals 528, 530 are adapted for sealably engaging the reduced flow area 524 of piston bore 522 so as to close the bore upon translatory movement of the plug 526 relative to the piston 518. FIG. 5A shows the annular seal 530 engaging the reduced flow area 524 so as to close the piston bore 522. This represents one of the closed configurations for the check valve 590.

The valve body 510 has a central annular opening 532 defined by opposing side walls 534, 536 intermediate the first and second openings 514, 516. The piston 518 is equipped with an outer annular flanged portion 521 intermediate its ends. The flanged portion 521 is disposed within the central annular opening 532 of the body 510 so as to divide the central annular opening into first and second chambers 532a,b. Accordingly, differential pressure across the chambers 532a,b, such as provided by pressurized hydraulic fluid in a known manner, induces reciprocal translatory movement of the piston 518 within the passageway 512 of the body 510.

The conduit portion 520 of the piston 518 is further equipped with an inner flange 538 that defines the reduced flow area 524. Tubular stop members 540, 542 are secured on each side of the inner flange 538 for limiting translatory movement of the plug 526 within the piston bore 522.

The check valve 590 further includes a pair of coil springs 544, 546 each having a first end 544a, 546a slidably disposed at least partially within one of the respective tubular stop members 540, 542 and a second end (not numbered) secured to inner stem-like portions 510a, 510b of the body 510. Each first coil spring ends 544a, 546a yieldably limits translatory movement of the plug 526 within the piston bore, as described further below.

Thus, increasing the pressure of the first chamber 532a above that of the second chamber 532b induces translatory movement of the piston 518 within the passageway 512 of the body 510 to one of two stop positions. In the stop position of FIGS. 5A-B, the outer flanged portion 521 of the piston 518 abuts a portion of the side wall 536 of the central annular opening 532. The tubular stop members 540, 542 are thereby moved with the piston 518 such that the first tubular stop member 540 engages one end of the plug 526 (see FIG. 5A) and moves the plug to a position where its annular seal 530 engages the inner flange 538 of the piston 518 so as to close the piston bore 522, and thus the valve 590. Those having ordinary skill in the art will appreciate that, due to the spring loading on the plug 526, the plug will be positioned—in the "no flow" condition—such that one of the annular seals 528, 530 engages the inner flange 538 to close the bore 522. This is true whether the piston 518 is positioned at the stop position of FIGS. 5A-B or the opposing stop position (not shown) abutting side wall 534.

From the position of FIG. 5A, the plug 526 is constrained to movement towards the coil spring 546 opposite the engaged tubular stop member 540. Such movement occurs when the plug 526 is energized by the pressure of fluid (e.g., sampled formation fluid) flowing through the passageway 512 from the first opening 514 to the second opening 516. Thus, the fluid flows from left to right (e.g., under the reciprocating action of a pump like pump 392 of FIGS. 3A-D) as indicted by the arrows (FIG. 5B) and is directed against the engaged end of the plug 526. This increases the fluid pressure in the passageway 512 behind (to the left of) the plug 625 until sufficient force is developed to overcome the bias of coil spring 546 and move the annular seal 530 out of engagement with the inner flange 538. In other words, the fluid pressure moves the plug 526 from the closed position of FIG. 5A to the open position of FIG. 5B by compressing the coil spring 546 so that it yields to such movement. It will therefore be recognized that the plug 526 essentially functions as an inner piston that is slidable within piston 518. The ends of the body stems 510a and 510b act as hard limits on the range of translatory movement by the plug 526, and thus limit the range of yielding by the coil spring 546. It will therefore be appreciated by those having ordinary skill in the art that a function of the coil springs 544, 546 is to bias the plug 526 towards a position where one of the annular seals 528, 530 engages the inner flange 538 so as to close the bore 522 and prevent fluid flow through the valve passageway 512.

The central portion of the plug 526 has a reduced diameter 548 that allows fluid flow around it (see FIG. 5B). The piston bore 522 has slots at the sides of the inner flange 538 that facilitate fluid flow about the plug 526. The slots are tapered from a very small opening close to the reduced flow area 524 in the center of the inner flange 538, to a fuller cross section consistent with the piston bore diameter employed along most of the of the piston conduit 520. This is intended to cause higher flow velocity when one of the plug's annular seals 528, 530 is close to the inner flange 538 so as to prevent fluid-born particles from accumulating and interfering with the operation of the seals. When so-equipped, the plug also provides a self-cleaning action as it opens and closes the piston bore 522, pushing any debris out of the way of the seal. These advantages obviate the need for an upstream particle filter, which other valve systems require to avoid build-up at the seals. Such a filter may, however, be optionally included. Accordingly, an upstream particle filter 560 is (partially) shown in the left portion of passageway 560. Another upstream particle filter (not shown) may be used in the right portion of the passageway as well, since fluid may flow in either direction through the passageway.

It will be also appreciated by those skilled in the art that the annular seal configurations of the present invention are more robust than the O-ring seats of FIGS. 3-4, since the majority of the fluid flow will not be directed against the seal (as in FIGS. 3-4), but would instead pass by the inner tapered edges 526a of the plug 526, which would bear most of the flow force.

Figure 6A:
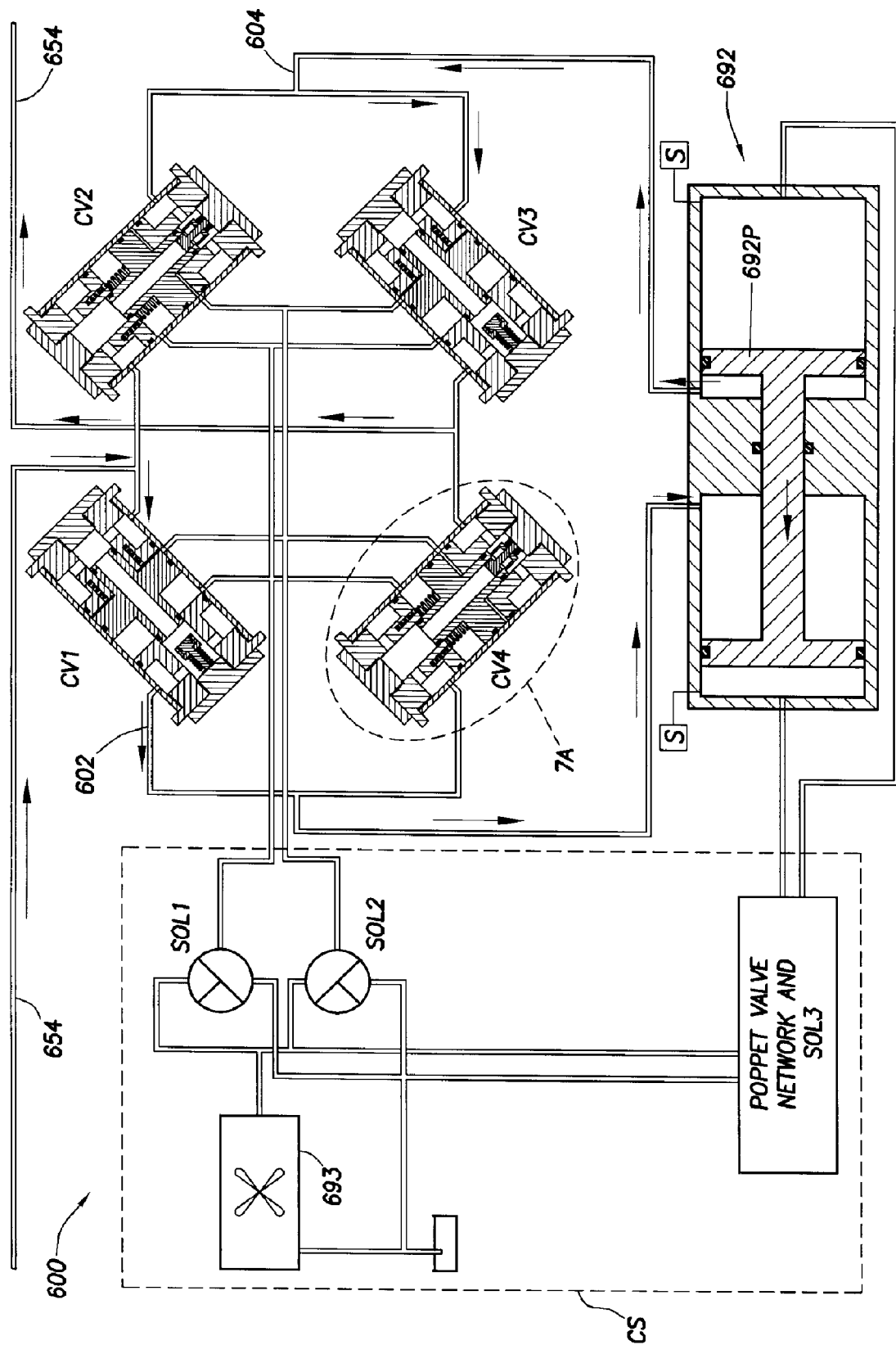
FIGS. 6A-B are schematic illustrations of a fluid pumping assembly according to another embodiment of the present invention, showing in particular control valve settings and flow directions according to first and second respective strokes of an inventive two-stroke piston "pump-up" cycle.
Figure 6B:
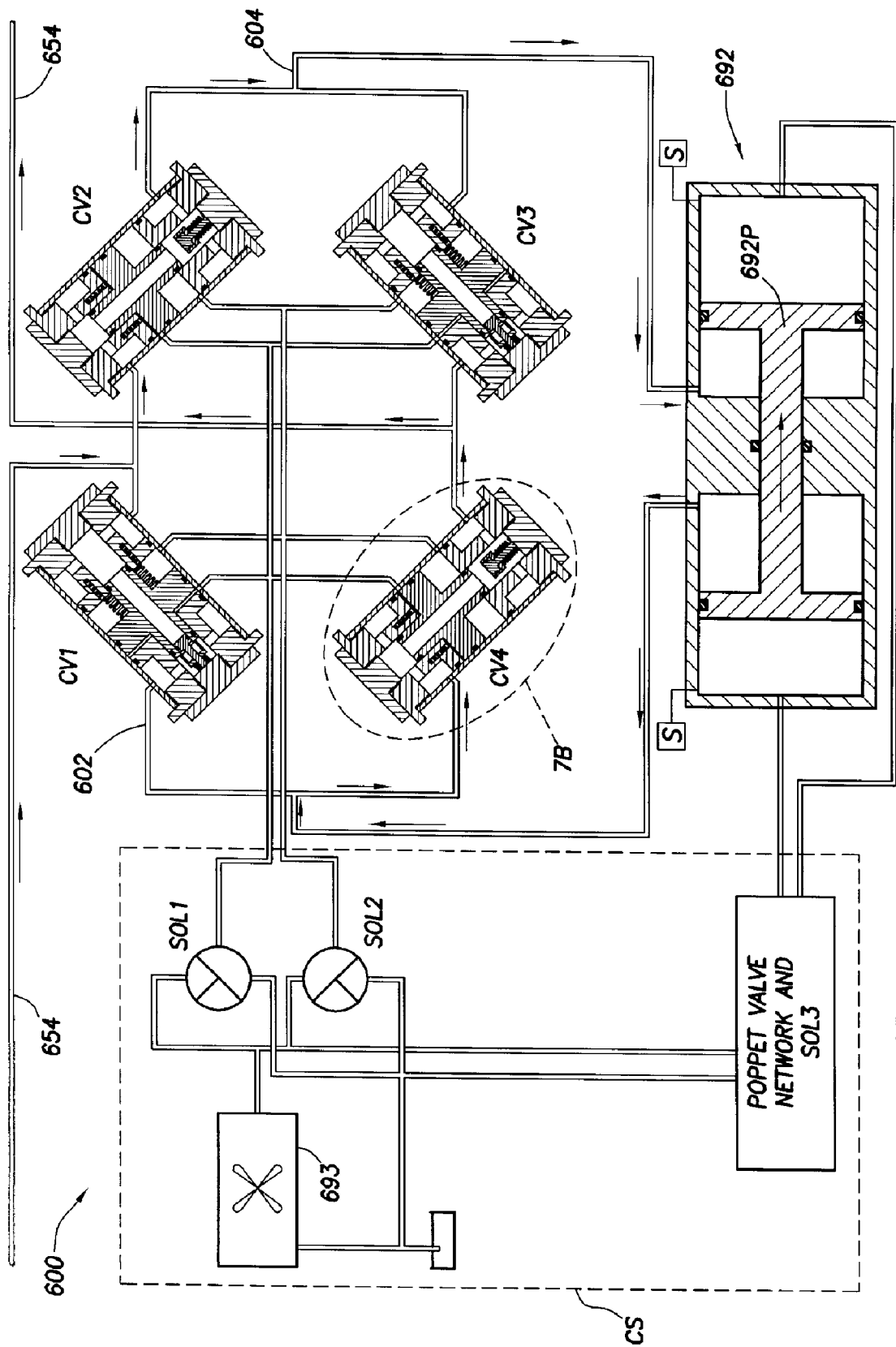
Figure 6C:
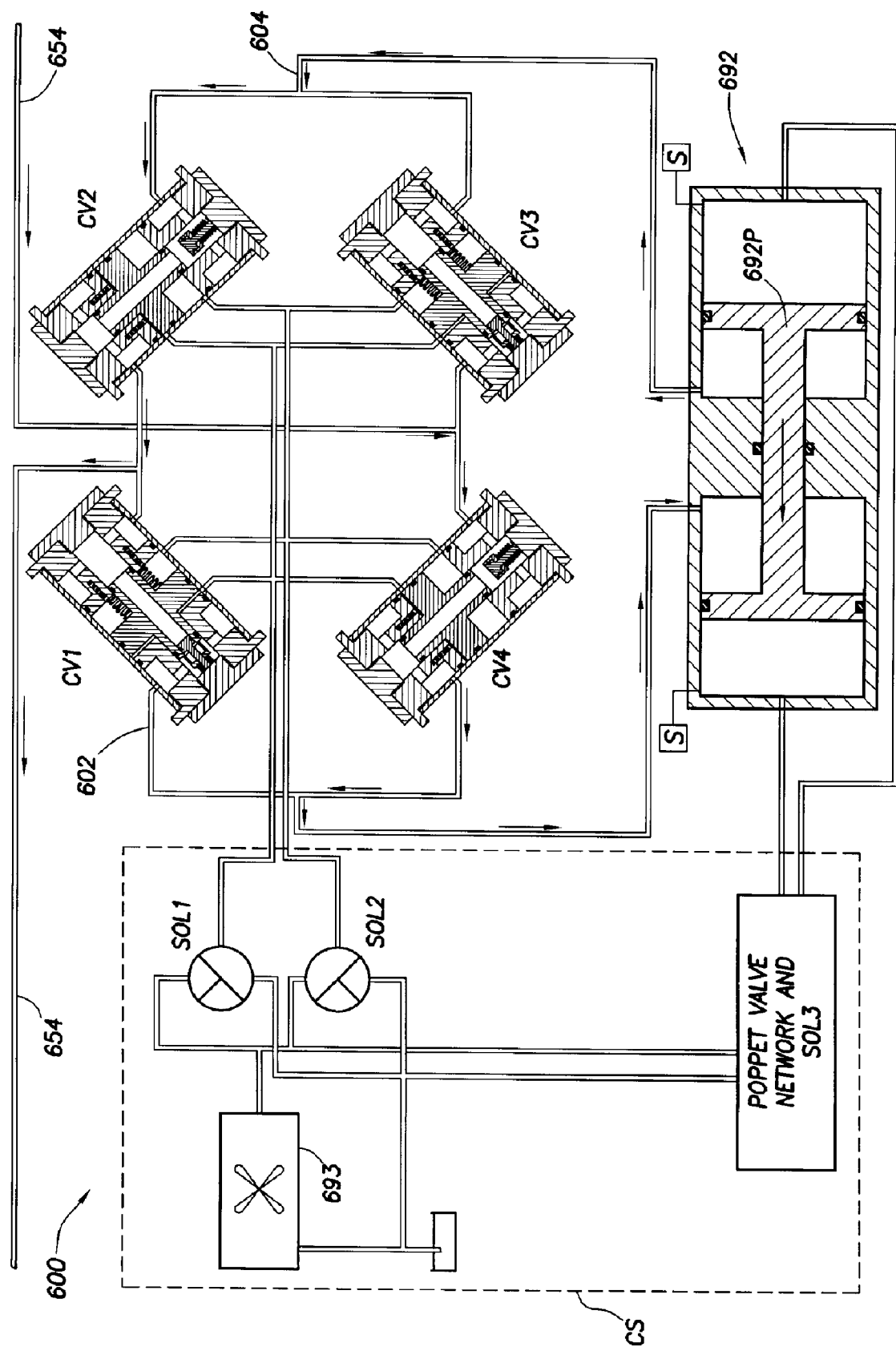
FIGS. 6C-D are schematic illustrations of the inventive fluid pumping assembly of FIGS. 6A-B, showing in particular control valve settings and flow directions according to first and second respective strokes of a two-stroke piston "pump-down" cycle.
Figure 6D:
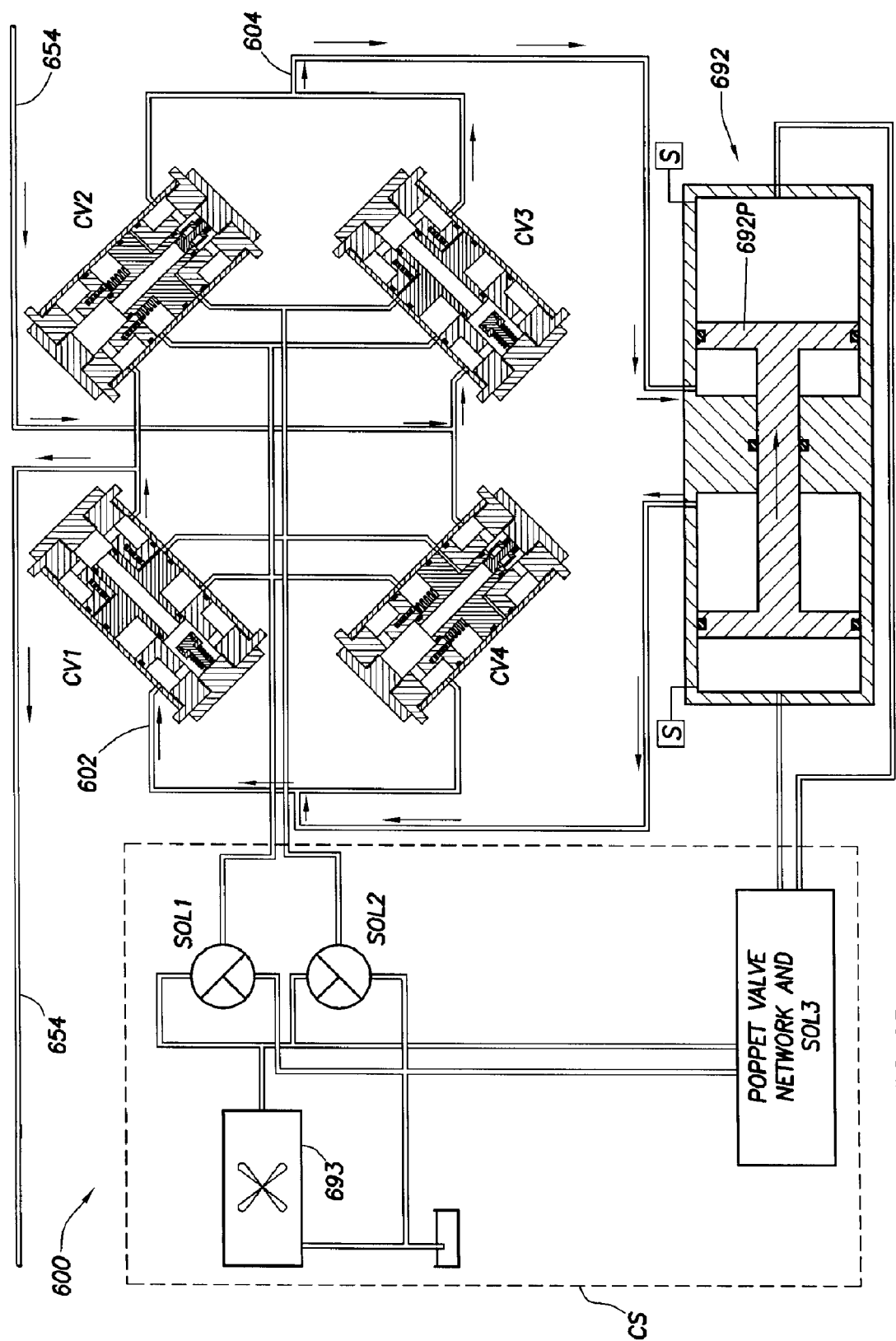
Figure 7A:
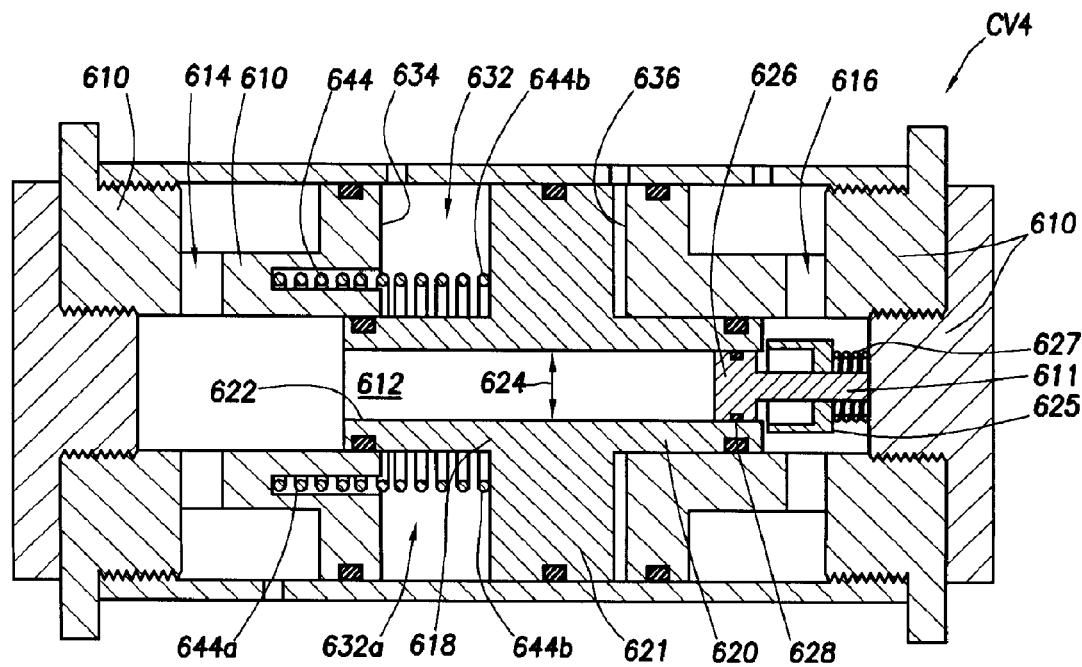
FIG. 7A is a detailed sectional schematic of one of the inventive control valves, as positioned in FIG. 6A.
Figure 7B:
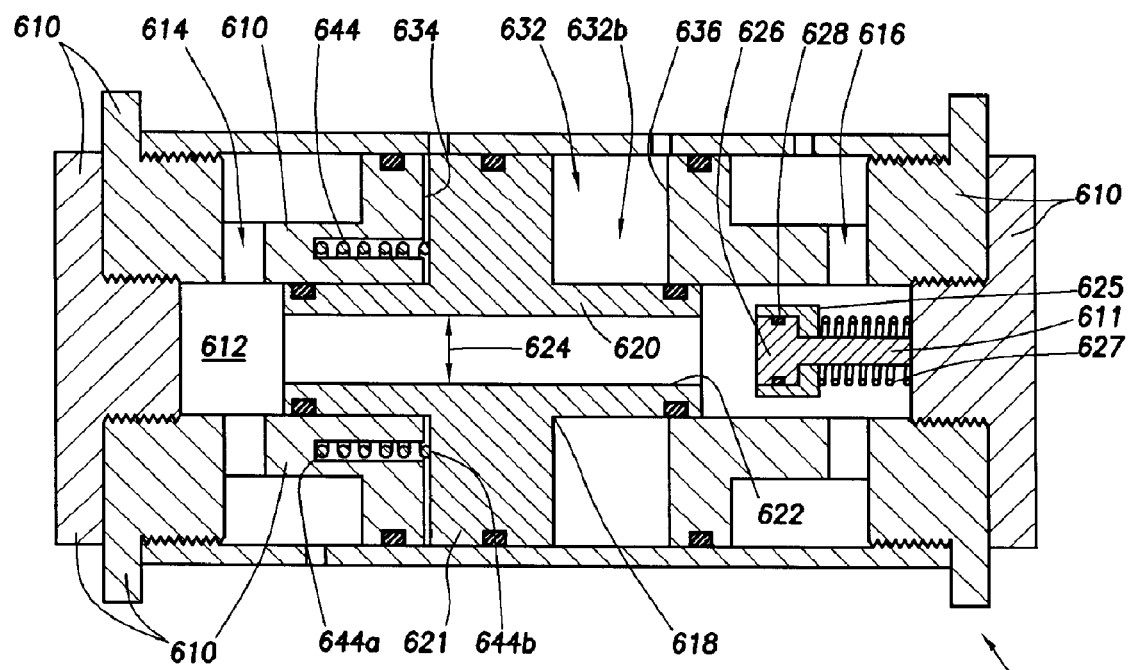
FIG. 7B is a detailed sectional schematic of the same control valve shown in FIG. 7A, but as positioned in FIG. 6B.

Turning now to FIGS. 6A-D and 7A-B, another embodiment of the present invention will now be described. FIGS. 6A-B are schematic illustrations of a pumping assembly 600 employing control valve settings and flow directions according to first and second respective strokes of a two-stroke piston "pump-up" cycle. FIGS. 6C-D are schematic illustrations of the pumping assembly 600 employing control valve settings and flow directions according to first and second respective strokes of a two-stroke piston "pump-down" cycle. FIG. 7A is a detailed sectional schematic of one of the inventive control valves, as positioned in FIG. 6A. FIG. 7B is a detailed sectional schematic of the same inventive control valve, as positioned in FIG. 6B.

The assembly 600 of FIGS. 6A-6D may be used, e.g., for pumping fluid at least partially through a downhole tool A (see FIGS. 1-2) disposed in a borehole penetrating a subsurface formation. Such pumping may include drawing fluid into the tool, discharging fluid from the tool, and/or moving fluid from one location to another location within the tool, as are well know in the related art. The pumping assembly includes a displacement unit or pump 692 for displacing fluid, a first flow line 602 equipped with a pair of control valves CV1, CV4 for selectively communicating fluid to or from the pump 692, and a second flow line 604 equipped with a pair of control valves CV2, CV3 for selectively communicating fluid to or from the pump 692.

Each of the control valves is shown in greater detail in FIGS. 7A-7B. Thus, e.g., control valve CV4 includes a body 610 having a fluid passageway 612 therethrough and first and second openings 614, 616 each adapted for receiving or discharging fluid from the passageway 612. A piston 618 is slidably disposed in the passageway 612 between the first and second openings 614, 616 of the body 610. The piston 618 has a conduit portion 620 that defines a bore 622 therethrough for conducting fluid through a portion of the passageway 612. The bore 622 has a reduced flow area 624 across the length thereof.

A substantially cylindrical plug 626 is carried within the passageway 612 of the body 610. The plug 626 is equipped with one or more annular seals 628 each disposed in a complementing annular channel (not numbered) for sealably engaging the reduced flow area 624 of piston bore 622. The piston bore and the valve CV4 as a whole are closed upon translatory movement of the piston 618 relative to the plug 626.

The plug 626 is secured to the body 610 via a stem-like portion 611 thereof so as to remain stationary within the passageway 612. The plug 626 is equipped with a sleeve 625 that overlays or protects each annular seal 628 of the plug 626 when the piston bore 622 is open, as shown in FIG. 7B. The sleeve 625 is loaded or urged by a coil spring 627 to the protective position of FIG. 7B, substantially insulating each annular seal 628 from the erosive effects of the flowing fluid.

The valve body 610 has a central annular opening 632 defined by opposing side walls 634, 636 intermediate the first and second openings 614, 616. The piston 618 is equipped with an outer annular flanged portion 621 intermediate its ends. The flanged portion 621 is disposed within the central annular opening 632 of the body 610 so as to divide the central annular opening into first and second chambers 632a (see FIG. 7A) and 632b (see FIG. 7B). Accordingly, differential pressure across the chambers 632a, b, such as provided by pressurized hydraulic fluid in a known manner, induces reciprocal translatory movement of the piston 618 within the passageway 612 of the body 610.

The control valve CV4 further includes a coil spring 644 having a first end 644a secured to the body 610 and a second end 644b disposed in the first chamber 632a and urging the outer flanged portion 621 of the piston 618 to a stop position (see FIG. 7A) abutting the side wall 636 of the central annular opening 632 opposite the first chamber 632a. This stop position places the reduced flow area 624 defined by the piston bore 622 into engagement with an annular seal 628 of the plug 626 so as to close the bore 622. From this position, the piston 618 is constrained to movement towards the coil spring 644 when energized by pressure within the second chamber 632b that overcomes the bias of the first coil spring 644. Such movement shifts the piston 618 from the closed position of FIG. 7A to the open position of FIG. 7B (i.e., the piston bore 622 is open).

With reference again to FIGS. 6A-D, the assembly 600 employs four control valves, like valve CV4 described above, with a piston pump 692 and a hydraulic pump 693 to control fluid flow. Hydraulic fluid is directed by the hydraulic pump 693 through solenoids SOL1 and SOL2, which form part of a control system CS for the assembly 600, control the operation of CV1-4. SOL3 and its associated poppet valve network is provided to reciprocate the central hydraulic piston 692p of pump 692. SOL3 is preferably linked to SOL1 and 2 to synchronize timing therebetween. When the piston 692p reaches the end of its stroke, the solenoids change state, thus causing the hydraulic fluid to be delivered to one of chamber 632a, 632b (see FIGS. 7A-7B) for moving the pistons 618 to achieve the desired open/close positions. The control system CS further includes sensors S that detects the position of the piston 692p (or, alternatively, simply detect when the piston 692p reaches the end of its stroke), and system electronics (not shown) that automatically command the solenoids to selectively deliver hydraulic fluid via pump 693 to achieve the proper settings for the control valves CV1-CV4. Thus, the control system is operable to synchronize the operation of the pump 692 with the control valves, such that each control valve is commanded to open or close its bore at or near the time that the pump piston 692p completes each of its two strokes.

For example, in the "pump-up" settings of FIGS. 6A-B, fluid is moved to the right in flow line 654 by opening control valves CV1, CV3 in respective flow lines 602, 604 and closing control valves CV2, CV4 during the first stroke (piston 692p moves left in FIG. 6A). Such fluid movement is continued during the second stroke (piston 692p moves right in FIG. 6B) by opening control valves CV2, CV4 in respective flow lines 604, 602 while closing control valves CV1, CV3.

Similarly, in the "pump-down" settings of FIGS. 6C-D, fluid is moved to the left in flow line 654 by opening control valves CV2, CV4 in respective flow lines 604, 602 and closing control valves CV1, CV3 during the first stroke (piston 692p moves left in FIG. 6C). Such fluid movement is continued during the second stroke (piston 692p moves right in FIG. 6D) by opening control valves CV1, CV3 in respective flow lines 602, 604 while closing control valves CV2, CV4.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A flow control valve, comprising:
   a body having a fluid passageway therethrough and first and second openings each adapted for receiving or discharging fluid from the passageway;
   a piston slidably disposed in the passageway between the first and second openings of the body, the piston having a conduit portion that defines a bore therethrough for conducting fluid through a portion of the passageway, the bore having a reduced flow area; and
   a plug carried within the body and equipped with one or more annular seals for sealably engaging the reduced flow area of piston bore so as to close the bore upon translatory movement of one of the piston, the plug, and combinations thereof.

2. The flow control valve of claim 1, wherein the plug is substantially cylindrical and is equipped with one or more annular recesses for carrying each respective annular seal.

3. The flow control valve of claim 2, wherein each annular seal has a sealing face oriented substantially perpendicularly to the axis of the passageway.

4. The flow control valve of claim 1, wherein each annular seal is an elastomeric O-ring.

5. The flow control valve of claim 1, wherein:
   the body has a central annular opening defined by opposing side walls intermediate the first and second openings; and
   the piston is equipped with an outer annular flanged portion intermediate its ends, the flanged portion being disposed within the central annular opening of the body so as to divide the central annular opening into first and second chambers, whereby differential pressure across the chambers induces reciprocal translatory movement of the piston within the passageway of the body.

6. The flow control valve of claim 5, wherein:
   the conduit portion of the piston is equipped with:
      an inner flange that defines the reduced flow area; and
      a tubular stop member on each side of inner flange for limiting translatory movement of the plug within the piston bore.

7. The flow control valve of claim 6, further comprising a pair of coil springs each having a first end slidably disposed at least partially within one of the tubular stop members and a second end secured to the body, each first end yieldably limiting translatory movement of the plug within the piston bore;

whereby increasing the pressure of one of the chambers above that of the other chamber induces translatory movement of the piston within the passageway of the body to a stop position where the outer flanged portion of the piston abuts one of the side walls of the central annular opening, the tubular stop members being moved with the piston such that one of the tubular stop members engages one end of the plug and moves the plug to a position where one of its annular seals engages the inner flange of the piston so as to close the piston bore, the plug thereby being constrained to movement towards the coil spring opposite the engaged tubular stop member under pressure of fluid flowing between the first and second openings against the engaged end of the plug.

8. The flow control valve of claim 5, wherein the plug is secured to the body so as to remain stationary within the passageway.

9. The flow control valve of claim 8, further comprising a first coil spring having a first end secured to the body and a second end disposed in the first chamber and urging the outer flanged portion of the piston to a stop position abutting the side wall of the central annular opening opposite the first chamber, the stop position placing the reduced flow area defined by the piston bore into engagement with an annular seal of the plug so as to close the bore, the piston thereby being constrained to movement towards the first coil spring under pressure within the second chamber that overcomes the bias of the first coil spring, such movement opening the piston bore.

10. The flow control valve of claim 8, wherein the plug is equipped with a spring-loaded sleeve that overlays each annular seal of the plug when the piston bore is open.

11. An assembly for pumping fluid at least partially through a downhole tool disposed in a borehole penetrating a subsurface formation, comprising:
   a pump for displacing fluid;
   a first flow line equipped with at least one control valve for selectively communicating fluid to or from the pump; and
   a second flow line equipped with at least one control valve for selectively communicating fluid to or from the pump;
   each of the at least one control valves comprising:
      a body having a fluid passageway therethrough and first and second openings each adapted for receiving or discharging fluid from the passageway;
      a piston slidably disposed in the passageway between the first and second openings of the body, the piston having a conduit portion tat defines a bore therethrough for conducting fluid through a portion of the passageway, the bore having a reduced flow area; and
      a plug carried within the body and equipped with one or more annular seals for sealably engaging the reduced flow area of piston bore so as to close the bore upon translatory movement of one of the piston, the plug, and combinations thereof.

12. The assembly of claim 11, further comprising a control system for synchronizing the operation of the pump and the control valves.

13. The assembly of claim 12, wherein:
   the pump is a two-stroke piston pump; and
   the control system commands each control valve to open or close its bore at or near the time that the pump completes each of its two strokes.

14. A method for controlling fluid flow through a passageway, comprising the steps of:
   slidably disposing a piston in the passageway, the piston having a conduit that reduces the flow area through die passageway;
   selectively closing the conduit of the piston using a plug having one or more annular seals, the selective closing being achieved by movement of one of the piston, the plug, and combinations thereof.

15. The method of claim 14, wherein the piston conduit is closed by movement of the piston to a stop position where the plug sealingly engages a portion of the piston conduit.

16. The method of claim 15 wherein the plug is biased to a first position when the piston conduit is moved to the stop position.

17. The method of claim 16, wherein the plug is moveable to a second position that opens the piston conduit under fluid pressure in the passageway that overcomes the bias.

18. The method of claim 15, wherein the piston is biased to the stop position and the plug is constrained against movement.

19. The method of claim 18, wherein the piston moveable from the stop position under a force the overcomes the bias, whereby the piston conduit is opened.

20. The method of claim 14, further comprising the step of pumping fluid though the passageway when the piston conduit is opened.

21. The method of claim 20, further comprising the step of synchronizing the pumping step with the selectively closing step, such that fluid is not pumped through the passageway when the piston conduit is closed.

22. The method of claim 21, wherein the pumping step comprises using a two-stroke piston pump.

23. The method of claim 22, wherein the synchronizing step comprises:
   closing the piston conduit at or near the time that the pump completes one stroke of its two-stroke cycle; and
   opening the piston conduit at or near the time that the pump completes the other stroke of its two-stroke cycle.

* * * * *